United States Patent
DeLuca et al.

(10) Patent No.: US 9,009,241 B2
(45) Date of Patent: Apr. 14, 2015

(54) DETERMINING CROWD TOPICS FROM COMMUNICATIONS IN A FOCUS AREA

(75) Inventors: Lisa Seacat DeLuca, San Francisco, CA (US); Charles Marcel Kinard, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 13/436,335

(22) Filed: Mar. 30, 2012

(65) Prior Publication Data
US 2013/0262592 A1  Oct. 3, 2013

(51) Int. Cl.
*G06F 15/16* (2006.01)
*G06Q 10/10* (2012.01)

(52) U.S. Cl.
CPC .................. *G06Q 10/107* (2013.01)

(58) Field of Classification Search
CPC ................. G06F 15/16; G06F 17/30
USPC ....................... 709/206; 705/14.52
See application file for complete search history.

(56) References Cited

U.S. PATENT DOCUMENTS

| | | |
|---|---|---|
| 6,876,988 B2 | 4/2005 | Helsper et al. |
| 2004/0064566 A1 | 4/2004 | Striemer |
| 2004/0181794 A1 | 9/2004 | Coleman et al. |
| 2008/0097994 A1 | 4/2008 | Teramoto et al. |
| 2008/0097999 A1 | 4/2008 | Horan |
| 2010/0004975 A1 | 1/2010 | White |
| 2011/0264523 A1* | 10/2011 | Scott et al. .................. 705/14.52 |
| 2012/0084374 A1* | 4/2012 | King et al. .................... 709/206 |

FOREIGN PATENT DOCUMENTS

WO   2005045678   5/2005

OTHER PUBLICATIONS

Foursquare. Wikipedia entry [retrieved on Mar. 19, 2012]. Retrieved from the Internet: <URL: en.wikipedia.org/w/index.php?title=Foursquare&printable=yes>.
Google Buzz. Wikipedia entry [retrieved on Mar. 19, 2012]. Retrieved from the Internet: <URL: en.wikipedia.org/w/index.php?title=Google_Buzz&printable=yes>.
Trendsmap. Webpage [retrieved on Mar. 19, 2012]. Retrieved from the Internet: <URL: trendsmap.com>.
Trendistic. Webpage [retrieved on Mar. 19, 2012]. Retrieved from the Internet: <URL: trendistic.indextank.com>.

* cited by examiner

*Primary Examiner* — David X Yi
(74) *Attorney, Agent, or Firm* — Cahn & Samuels, LLP

(57) ABSTRACT

An embodiment of the invention provides a system and method for managing computing resources, wherein a data analyzer analyzes communications from electronic devices to identify a common topic among the communications in a predetermined area. In at least one embodiment, only communications that have been created within a predetermined time period are analyzed. A processor connected to said data analyzer generates a title based on the common topic. A communications module connected to the processor sends an electronic message to a user, wherein the electronic message includes the title and the predetermined area. In at least one embodiment, the title and the predetermined area are displayed on a graphical user interface.

25 Claims, 7 Drawing Sheets

DETERMINING CROWD TOPICS FROM COMMUNICATIONS IN A FOCUS AREA

BACKGROUND

The present invention is in the field of methods, systems, and computer program products for determining crowd topics from communications in a focus area.

The World Wide Web provides access to numerous social and business networking applications (e.g., FACEBOOK-.COM, TWITTER.COM, LINKEDIN.COM). Modern technological advances have made the Internet more accessible, particularly on mobile electronic devices such as cellular (or smart) telephones and tablet computers. As a result, mobile web applications have become an increasingly popular means for people to communicate with their friends, family, and colleagues. For example, members of social networking sites are able to stay in touch with their friends and family by sharing and receiving wall posts, comments and status updates.

SUMMARY OF THE INVENTION

An embodiment of the invention provides a system and method for managing computing resources, wherein a data analyzer analyzes communications from electronic devices to identify a common topic among the communications in a predetermined area. In at least one embodiment, only communications that have been created within a predetermined time period are analyzed. A processor connected to said data analyzer generates a title based on the common topic. A communications module connected to the processor sends an electronic message to a user, wherein the electronic message includes the title and the predetermined area. In at least one embodiment, the title and the predetermined area are displayed on a graphical user interface.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention includes a method to interpret geographical, news, and status information to provide a crowd topic for a given set of related social interactions. Short descriptive "one-liners" have grown increasingly popular due to the success of companies such as Twitter™, Facebook™ status updates, and Google™ Plus. Individuals communicate quickly with friends or the public about their day or random thoughts. Some messages also include location information to those messages, such as metadata indicating the individual's geographic location (e.g., on a map). If there is a lot of activity around a certain area of town it could be predicted that a crowd exists there or a number of individuals are sharing in a common experience.

Figure 1:
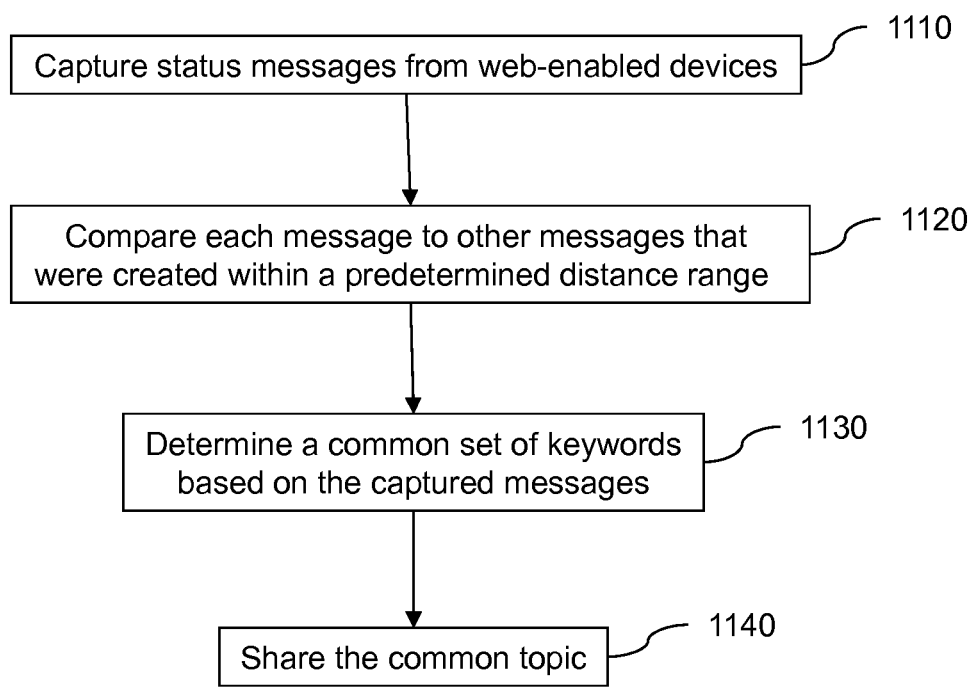
FIG. 1 is a flow diagram illustrating a method of determining crowd topics according to an embodiment of the invention.

FIG. 1 is a flow diagram illustrating a method of determining crowd topics utilizing status messages and location data according to an embodiment of the invention. Status messages from web-enabled devices are captured 1110. In one embodiment, the status messages are captured from one or more web applications that the devices are connected to. Each message is compared to other messages that were created within a predetermined distance range (e.g., messages within 1, 2, 5 miles from each other) 1120. In at least one embodiment, cell tower triangulation and/or global positioning system (GPS) can be used to determine the geographic location of the web-enabled devices. The distance range can be determined by the user or a system administrator. Moreover, the distance range can increase or decrease due to message activity. For example, the distance range can be decreased when there is a lot of message activity to make the analysis more fine grained.

A common set of keywords is determined based on the captured messages 1130. In at least one embodiment, acronyms (e.g., UCSF=University of California San Francisco), dictionary equivalent words (e.g., game and match), and/or related words (e.g., food and eating) are used to determine commonality. Crowd analyzed relationship words can also be used to determine commonality. For example, individuals might recognize "Wiches" to be the same as "Sandwitches DeLuxx Sandwich restaurant".

The common topic is shared 1140 amongst the individuals, social or professional network users/contacts, and/or subscribers to a service. Individuals outside of the topic area who are interested in the topic area can be provided with directions to move to that topic area. Individuals with a common interest can be found. For example, if the San Francisco Giants win the World Series in Texas, an individual in Texas can locate where other San Franciscans are celebrating the win locally, for instance, by receiving the common topic "San Francisco Giants" and topic area "1625 West Street".

In another embodiment of the invention, individuals who subscribe to certain topics are alerted, for example, via e-mail, push notification, or short message service (SMS). Subscribers (also referred to herein as "users") can create and/or modify alert settings to be alerted only when his or her mobile device is a certain distance from the topic area. For example, the alert settings can include "show me when another set of Pittsburgh Steelers fans are within a mile from me".

Alert settings can also include group size restrictions. For example, the alert settings can include "show me when more than 10 people join the topic group within 1 mile of each other". In another example, a subscriber may wish to avoid such an area, such as when a flash crowd has met that has halted traffic. This information can be used to reroute someone who is not interested in being delayed.

Subscribers can also be alerted if a topic is joined by a social or professional network contact. For example, if Bob is a social network contact of John, then John can be alerted when Bob joins the topic "world series". In addition, alert settings can also include demographic information of the individuals in the group.

Demographics information used to determine likelihood of interest can include age, sex, hair color, and/or education level. For example, the alert settings can include "show me when female individuals between the age of 25-30 years old who own a dachshund join a group". In at least one embodiment, a combination of alert settings are used (e.g., demographics, location, and size of group).

At least one embodiment compares the common topic against news events to add additional meta-data about the event. Thus, the news information could be added as a subtopic. For example, if there is a lot of activity around AT&T Park because the Giants just won the World Series, and the common topic "San Francisco Giants" and/or "World Series" is identified, then the system can search the Internet using the common topic as a query to locate a news story and predict the reason for the large number of status updates.

In another embodiment, terms to be included in a status update are suggested to a user posting a new status message, for example, based on the user's location and/or profile. For example, if other individuals in the user's area have posted about tigers at the zoo, then the term "zoo" and/or "tigers" are suggested to the user when composing a new status message. New status messages are captured as they enter the system and the system continues to analyze their content. In yet another embodiment, a user may set a preference to increase or decrease the time range in which messages are analyzed. Over the course of a year there is going to be more posts then within the last hour. By increasing or decreasing the time range, the user will learn a lot about specific periods of time and current activities.

Figure 2:
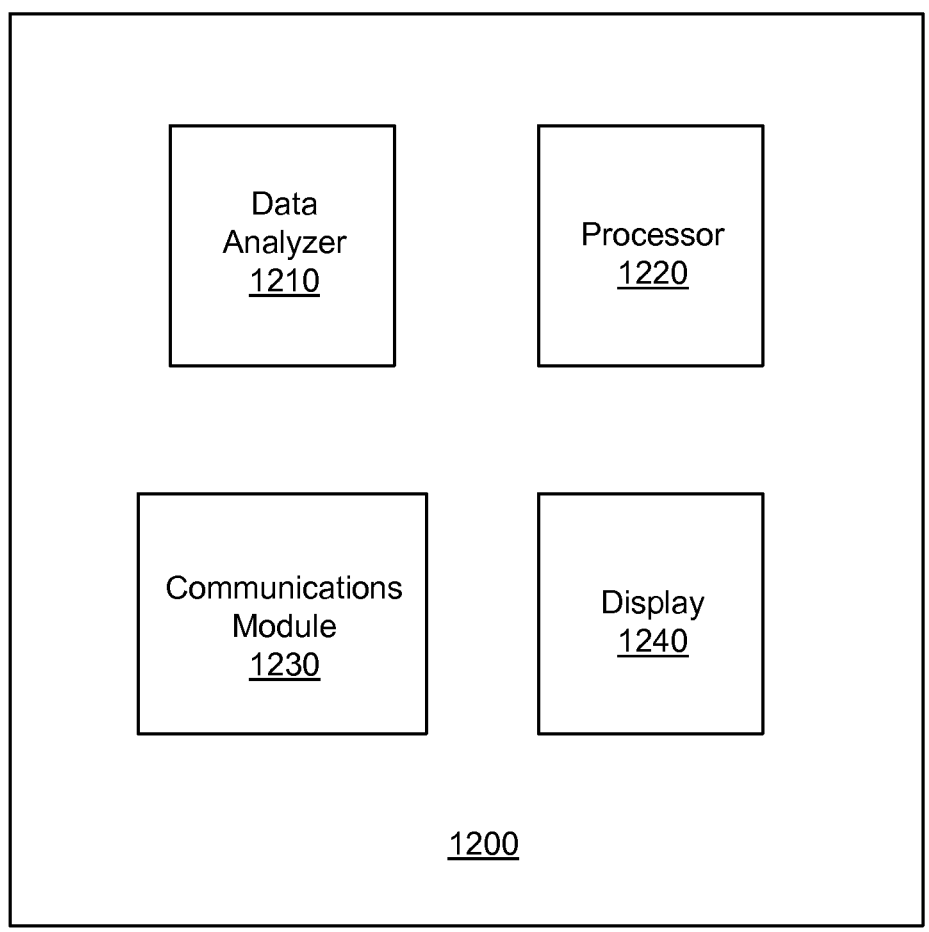
FIG. 2 is a diagram illustrating a system for determining crowd topics according to an embodiment of the invention.
Figure 3:
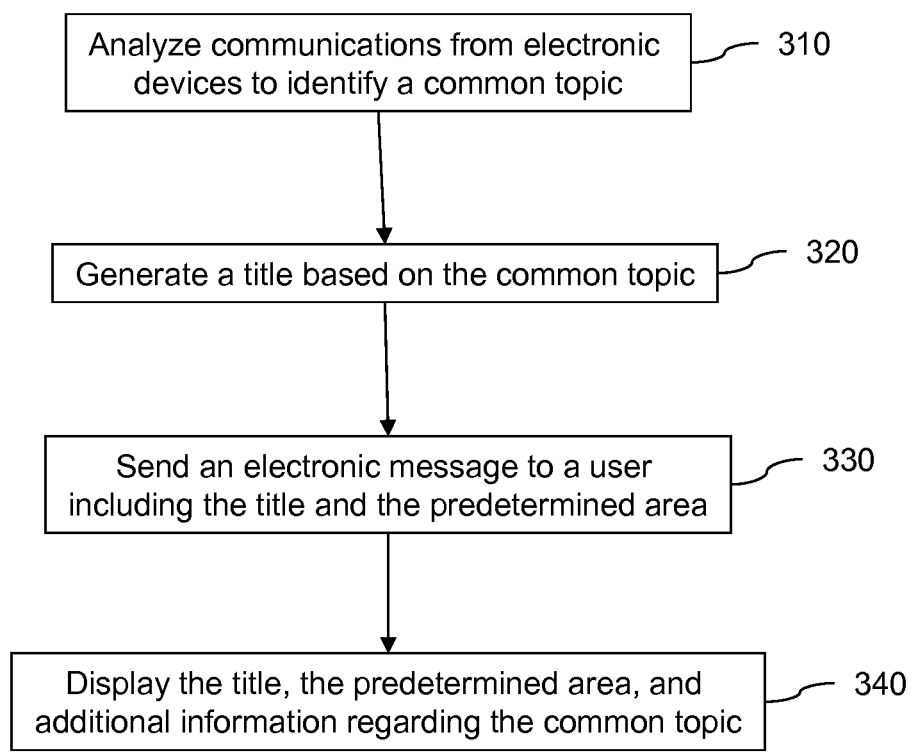
FIG. 3 is a flow diagram illustrating a method of determining crowd topics according to another embodiment of the invention.
Figure 4:
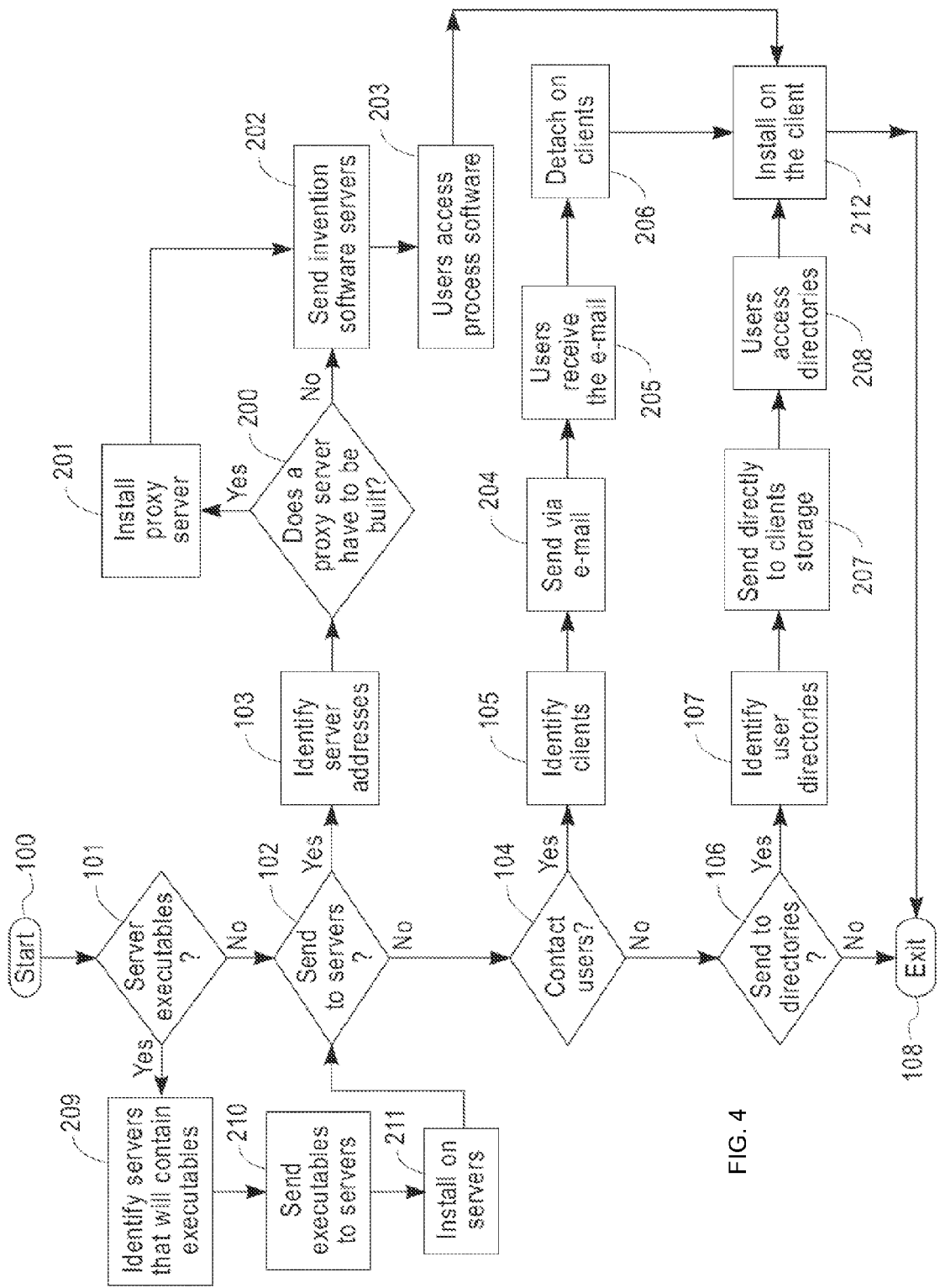
FIG. 4 is a diagram illustrating a system and method for deployment according to an embodiment of the invention.
Figure 5:
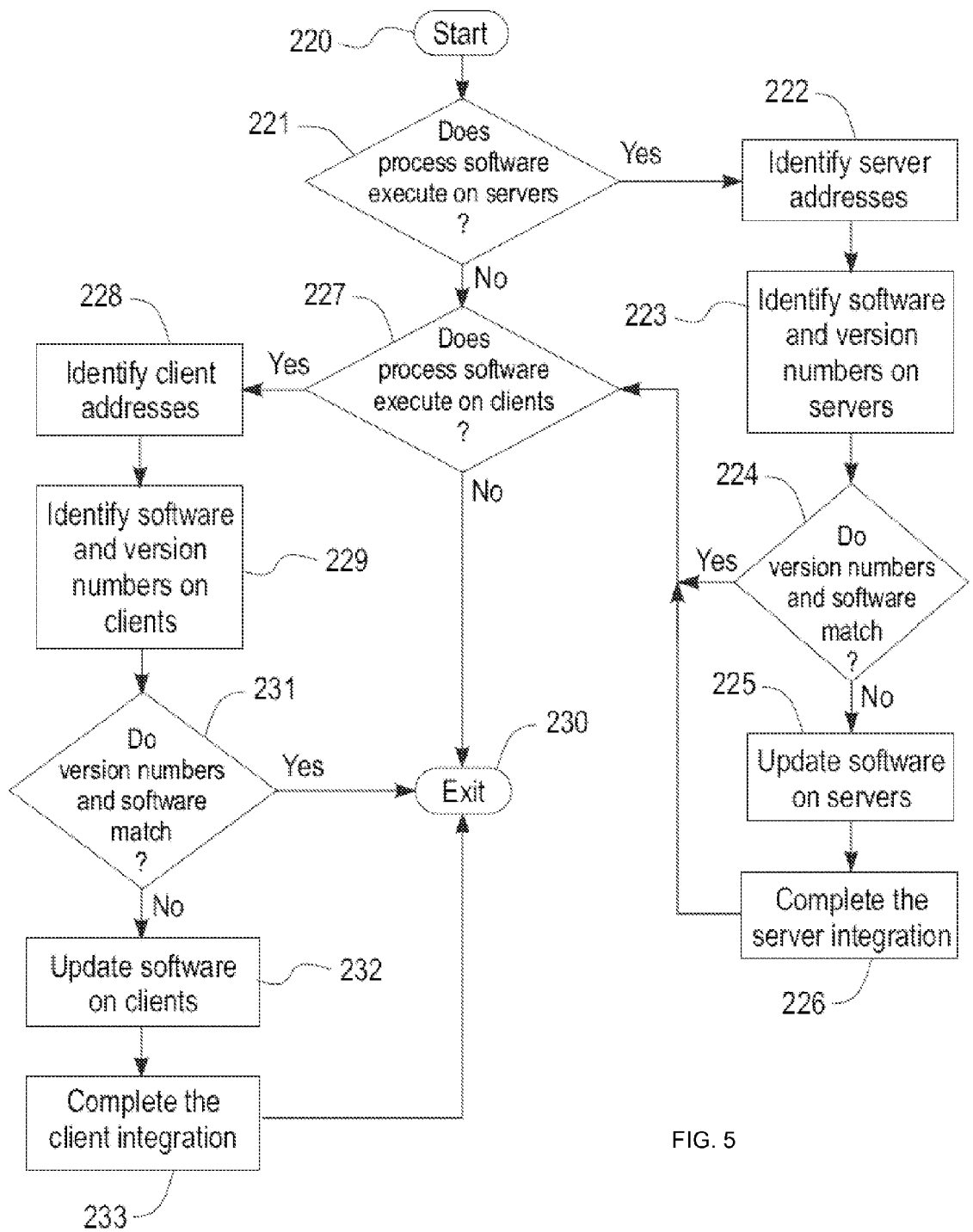
FIG. 5 is a diagram illustrating a system and method for integration according to an embodiment of the invention.
Figure 6:
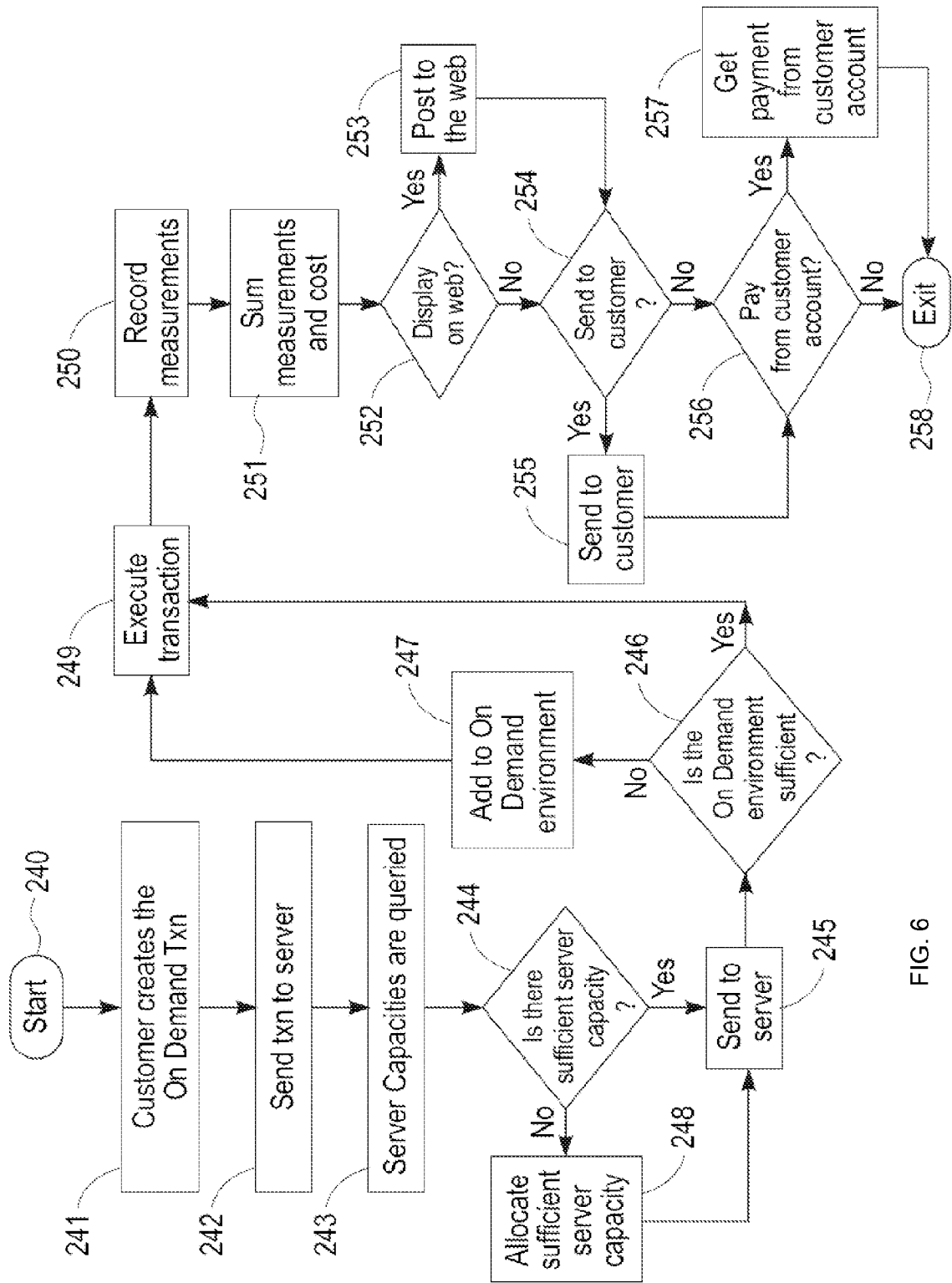
FIG. 6 is a diagram illustrating a system and method for on demand according to an embodiment of the invention.

FIG. 2 is a diagram illustrating a system 1200 for determining crowd topics according to an embodiment of the invention, wherein the system 1200 includes a data analyzer 1210, a processor 1220, and a communications module 1230. Although FIG. 2 illustrates that the data analyzer 1210, processor 1220, and communications module 1230 are hardware devices residing on a single unitary machine, the data analyzer 2110, a processor 1220, and a communications module 1230 could reside on multiple interconnected machines. FIG. 3 is a flow diagram illustrating a method of determining crowd topics, for example, using the system 1200, according to an embodiment of the invention.

The data analyzer 1210 analyzes communications from electronic devices (e.g., mobile telephones, tablet computers, laptop computers) to identify a common topic among the communications in a predetermined area 310. In at least one embodiment, the communications include text messages, status updates, and/or e-mails. In another embodiment, only communications that have been created within a predetermined time period (e.g., within the past hour, between 12:00 PM-5:00 PM EST) are analyzed. The communications can be captured from one or more web applications that the electronic devices are connected to and/or the communications can be captured from a mobile application installed on the electronic devices.

In at least one embodiment of the invention, the common topic is identified by identifying communications that share at least one keyword (term, tag, hashtag (e.g., "#baseball" on Twitter™), or following (e.g., "@sfgiants"). For example, the data analyzer 1210 identifies that more than 100 status updates in the 20036 zip code include one or more of the words parade, fireworks, fourth, July, and independence. In another example, the data analyzer 1210 identifies that greater than 50% of the text messages in the Dupont Circle neighborhood of Washington, D.C. include one or more of the words traffic, accident, or construction.

In at least one embodiment of the invention, the predetermined area includes a zip code, an area code, a city, a state, a neighborhood (e.g., Northwest Washington, D.C.; Chinatown, New York City), and/or an area within a radius from a set location (e.g., 1 mile from a street address, 5 miles from a zip code, 10 miles from a GPS location). In another embodiment, the predetermined area comprises an area including messages that are within a predetermined distance from each other (e.g., messages that are 0.1 miles from each other) and have been created within a predetermined time period (e.g., within the last 6 hours) and/or share a common topic.

In yet another embodiment, the size of the predetermined area is automatically increased or decreased based on the volume of communications sharing a common topic and/or volume of all communications in the current predetermined area. For example, if the number of text messages in the predetermined area that share the topic "parade" increases to above 100, then the size of the predetermined area can be automatically increased (to locate other focus areas) or decreased (to make the analysis more fine grained). Whether the predetermined area is increased or decreased can be determined by the user or administrator of the system 1200. In another example, if over 100 status updates are posted in the area (regardless of topic) within a predetermined time period (e.g., 30 minutes), then the size of the predetermined area can be automatically increased or decreased.

The processor 1220 and/or the data analyzer 1210 generates a title based on the common topic 320. For example, if the words snow, blizzard, traffic, school, closings, delays are present in the communications, then the processor 1220 generates the title "snow". In another example, if the words protest, demonstration, riot, march, arrests, and police are present in the communications, then the processor 1220 generates the title "protest". In at least one embodiment, the term that is most commonly found in the predetermined area is selected as the title.

In at least one embodiment of the invention, an electronic message is sent to a user (also referred to herein as a "subscriber"), wherein the electronic message includes the title and the predetermined area 330. In another embodiment, the electronic message further includes directions to a location, a news story related to the common topic, and/or a webpage related to the common topic. For example, if the common topic is "Chicago Bears", then the electronic message could include directions to Soldier Field, news stories previewing this week's game, and a URL to the Chicago Bears' website.

In at least one embodiment of the invention, the electronic message is only sent to the user if the identified common topic is present on a list of topics selected by the user (e.g., weather, traffic). In another embodiment, the electronic message is only sent to the user if a threshold number of messages were identified as having a common topic (e.g., greater than 50 messages) and/or the user is located within a threshold distance from the predetermined area (e.g., 10 miles). In yet another embodiment, the electronic message is only sent to the user if a threshold number or threshold percentage of the authors of the communications satisfy user criteria. The user criteria can include, for example, age, gender, and/or education level of the authors, and/or whether the authors are social or professional network contacts of the user.

In at least one embodiment of the invention, the system 1200 further includes a display 1240 (e.g., graphical user interface) for displaying the title, the predetermined area, and additional information regarding the common topic 340. The data analyzer 1210, communications module 1230, and/or the display 1240 are connected to the processor 1220. As used herein, the term "connected" includes operationally connected, logically connected, in communication with, physically connected, engaged, coupled, contacts, linked, affixed, and attached. In at least one embodiment, the display 1240 is the screen on the user's mobile telephone.

While it is understood that the process software (e.g., the first, second, and third program instructions) may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server and then it will be stored on the proxy server.

Step 100 begins the deployment of the process software. The first thing is to determine if there are any programs that will reside on a server or servers when the process software is executed 101. If this is the case then the servers that will contain the executables are identified 209. The process software for the server or servers is transferred directly to the servers' storage via FTP or some other protocol or by copying though the use of a shared file system 210. The process software is then installed on the servers 211. Next, a determination is made on whether the process software is be deployed by having users access the process software on a server or servers 102. If the users are to access the process software on servers then the server addresses that will store the process software are identified 103.

A determination is made if a proxy server is to be built 200 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 201. The process software is sent to the servers either via a protocol such as FTP or it is copied directly from the source files to the server files via file sharing 202. Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems 203. Another embodiment is to have the servers automatically copy the process software to each client and then run the installation program for the process software at each client computer. The user executes the program that installs the process software on his client computer 212 then exits the process 108.

In step 104 a determination is made whether the process software is to be deployed by sending the process software to users via e-mail. The set of users where the process software will be deployed are identified together with the addresses of the user client computers 105. The process software is sent via email to each of the users' client computers. The users then receive the e-mail 205 and then detach the process software from the e-mail to a directory on their client computers 206. The user executes the program that installs the process software on his client computer 212 then exits the process 108.

Lastly a determination is made on whether to the process software will be sent directly to user directories on their client computers 106. If so, the user directories are identified 107. The process software is transferred directly to the user's client computer directory 207. This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software 208. The user executes the program that installs the process software on his client computer 212 then exits the process 108.

The process software (e.g., the first, second, and third program instructions) is integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Step 220 begins the integration of the process software. The first thing is to determine if there are any process software programs that will execute on a server or servers 221. If this is not the case, then integration proceeds to 227. If this is the case, then the server addresses are identified 222. The servers are checked to see if they contain software that includes the operating system (OS), applications, and network operating systems (NOS), together with their version numbers that have been tested with the process software 223. The servers are also checked to determine if there is any missing software that is required by the process software 223.

A determination is made if the version numbers match the version numbers of OS, applications and NOS that have been tested with the process software 224. If all of the versions match and there is no missing required software the integration continues in 227.

If one or more of the version numbers do not match, then the unmatched versions are updated on the server or servers with the correct versions 225. Additionally if there is missing required software, then it is updated on the server or servers 225. The server integration is completed by installing the process software 226.

Step 227 which follows either 221, 224 or 226 determines if there are any programs of the process software that will execute on the clients. If no process software programs execute on the clients the integration proceeds to 230 and exits. If this not the case, then the client addresses are identified 228.

The clients are checked to see if they contain software that includes the operating system (OS), applications, and network operating systems (NOS), together with their version numbers that have been tested with the process software 229. The clients are also checked to determine if there is any missing software that is required by the process software 229.

A determination is made is the version numbers match the version numbers of OS, applications and NOS that have been tested with the process software 231. If all of the versions match and there is no missing required software, then the integration proceeds to 230 and exits.

If one or more of the version numbers do not match, then the unmatched versions are updated on the clients with the correct versions 232. In addition, if there is missing required software then it is updated on the clients 232. The client integration is completed by installing the process software on the clients 233. The integration proceeds to 230 and exits.

The process software (e.g., the first, second, and third program instructions) is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements f use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Step 240 begins the On Demand process. A transaction is created than contains the unique customer identification, the requested service type and any service parameters that further specify the type of service 241. The transaction is then sent to the main server 242. In an On Demand environment the main server can initially be the only server, and then as capacity is consumed other servers are added to the On Demand environment.

The server central processing unit (CPU) capacities in the On Demand environment are queried 243. The CPU requirement of the transaction is estimated, then the server's available CPU capacity in the On Demand environment is compared to the transaction CPU requirement to see if there is sufficient CPU available capacity in any server to process the transaction 244. If there is not sufficient server CPU available capacity, then additional server CPU capacity is allocated to process the transaction 248. If there was already sufficient Available CPU capacity then the transaction is sent to a selected server 245.

Before executing the transaction, a check is made of the remaining On Demand environment to determine if the environment has sufficient available capacity for processing the transaction. This environment capacity consists of such things as but not limited to network bandwidth, processor memory, storage etc. 246. If there is not sufficient available capacity, then capacity will be added to the On Demand environment 247. Next the required software to process the transaction is accessed, loaded into memory, and then the transaction is executed 249.

The usage measurements are recorded 250. The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer 251.

If the customer has requested that the On Demand costs be posted to a web site 252 then they are posted 253. If the customer has requested that the On Demand costs be sent via e-mail to a customer address 254 then they are sent 255. If the customer has requested that the On Demand costs be paid directly from a customer account 256 then payment is received directly from the customer account 257. The last step is exit the On Demand process.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, portable computer diskette, hard disk, random access memory (RAM), read-only memory (ROM), erasable programmable read-only memory (EPROM or Flash memory), optical fiber, portable compact disc read-only memory (CD-ROM), optical storage device, magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of at least one programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
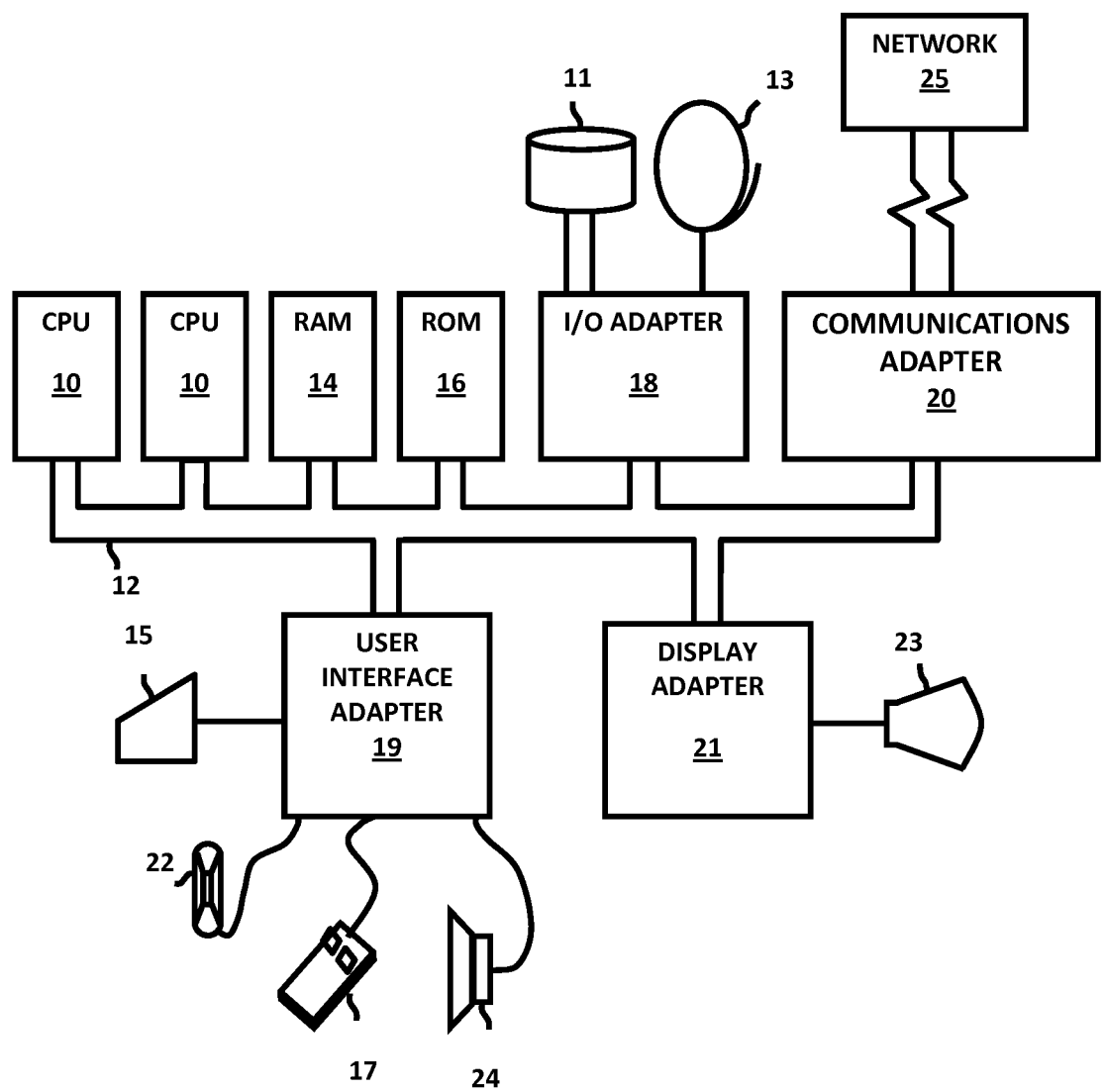
FIG. 7 illustrates a computer program product according to an embodiment of the invention.

Referring now to FIG. 7, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   analyzing communications from electronic devices, the communications including only communications that have been created within a predetermined time period, said analyzing including identifying a common topic among the communications in a predetermined area, the predetermined area including at least one of:
      a geographic area within a threshold distance from a user,
      a predefined city, and
      a predefined zip code;
   generating a title with a processor based on the common topic; and
   displaying the title and the predetermined area on a graphical user interface only when:
      the user is located within a predetermined distance from the predetermined area,
      the identified common topic is present on a predetermined list of topics,
      an author of at least one of the communications is present on a predetermined list of authors,
      a predetermined number of authors of the communications satisfy a user criteria and
      a predetermined percentage of authors of the communications satisfy the user criteria.

2. The method according to claim 1, wherein said identifying of the common topic includes identifying communications that share at least one keyword.

3. The method according to claim 1, wherein said predetermined area includes an area including messages that are within a predetermined distance from each other and at least one of:
   have been created within a predetermined time period, and
   share the common topic.

4. The method according to claim 1, further including one of automatically increasing and automatically decreasing the size of the predetermined area based on at least one of volume of communications sharing a common topic and volume of all communications in the current predetermined area.

5. The method according to claim 1, wherein said electronic message further includes step-by-step directions to a geographic location.

6. The method according to claim 1, wherein said electronic message further includes at least one news story related to the common topic and at least one webpage related to the common topic.

7. The method according to claim 1, wherein the electronic message is only sent to the user if the user is located within a predetermined distance from the predetermined area.

8. The method according to claim 1, wherein the electronic message is only sent to the user if greater than a predetermined number of messages were identified as having a common topic.

9. The method according to claim 1, wherein the electronic message is only sent to the user if the identified common topic is present on a predetermined list of topics.

10. The method according to claim 1, wherein the electronic message is only sent to the user if an author of at least one of the communications is present on a predetermined list of authors.

11. The method according to claim 1, wherein the electronic message is only sent to the user if at least one of:
    a predetermined number of authors of the communications satisfy a user criteria, and
    a predetermined percentage of authors of the communications satisfy the user criteria.

12. A method comprising:
    analyzing communications from mobile electronic devices with a data analyzer,
    said analyzing including identifying a common topic among the communications in a predetermined area, the communications including only communications that have been created within a predetermined time period, the predetermined area including at least one of a city and a zip code predefined by the user;
    generating a title with a processor based on the common topic; and
    sending an electronic message including the title and the predetermined area to a user with a communications module only when:
       the user is located within a predetermined distance from the predetermined area,
       the identified common topic is present on a predetermined list of topics,
       an author of at least one of the communications is present on a predetermined list of authors,
       a predetermined number of authors of the communications satisfy a user criteria, and
       a predetermined percentage of authors of the communications satisfy the user criteria.

13. The method according to claim 12, wherein said predetermined area includes a geographic area including messages that are within a predetermined distance from each other and share the common topic.

14. The method according to claim 12, further including one of automatically increasing and automatically decreasing the size of the predetermined area based on at least one of volume of new communications sharing a common topic and volume of all new communications in the current predetermined area.

15. The method according to claim 12, wherein said electronic message further includes step-by-step geographic directions to a location, at least one news story related to the common topic, and at least one webpage related to the common topic.

16. A system comprising:
a data analyzer for analyzing communications from electronic devices to identify a common topic among the communications in a predetermined area, the communications including only communications that have been created within a predetermined time period, the predetermined area including at least one of:
   a geographic area within a threshold distance from a user,
   a predefined city, and
   a predefined zip code;
a processor connected to said data analyzer, said processor generates a title based on the common topic; and
a communications module connected to said processor, said communications module sends an electronic message to the user only when:
   the user is located within a predetermined distance from the predetermined area,
   the identified common topic is present on a predetermined list of topics,
   an author of at least one of the communications is present on a predetermined list of authors,
   a predetermined number of authors of the communications satisfy a user criteria, and
   a predetermined percentage of authors of the communications satisfy the user criteria,
the electronic message including the title and the predetermined area.

17. The system according to claim 16, further comprising a display connected to said processor, said display displays the title and the predetermined area.

18. The system according to claim 16, wherein the predetermined area includes an area having messages that are within a predetermined geographic distance from each other and at least one of:
   have been created within a predetermined time period, and
   share the common topic.

19. The system according to claim 16, wherein the size of the predetermined area is one of automatically increased and automatically decreased based on at least one of volume of communications sharing a common topic and volume of all communications in the current predetermined area.

20. The system according to claim 16, wherein said electronic message further includes step-by-step geographic directions to a geographic location, at least one news story related to the common topic, and at least one webpage related to the common topic.

21. The system according to claim 16, wherein said communications module only sends the electronic message to the user if at least one of:
   the identified common topic is present on a predetermined list of topics,
   the user is located within a threshold distance from the predetermined area,
   a threshold number of messages were identified as having a common topic,
   a threshold number of authors of the communications satisfy a user criteria, and
   a threshold percentage of authors of the communications satisfy the user criteria.

22. A computer program product comprising:
a non-transitory computer readable storage medium;
first program instructions to analyze communications from electronic devices, the communications including only communications that have been created within a predetermined time period, said analyzing including identifying a common topic among the communications in a predetermined area, the predetermined area including at least one of:
   a geographic area within a threshold distance from a user,
   a predefined city, and
   a predefined zip code;
second program instructions to generate a title based on the common topic; and
third program instructions to send an electronic message to the user only when:
   the user is located within a predetermined distance from the predetermined area,
   the identified common topic is present on a predetermined list of topics,
   an author of at least one of the communications is present on a predetermined list of authors,
   a predetermined number of authors of the communications satisfy a user criteria and
   a predetermined percentage of authors of the communications satisfy the user criteria,
the electronic message including the title and the predetermined area,
wherein said first program instructions, said second program instructions, and said third program instructions are stored on said computer readable storage medium.

23. The method according to claim 1, wherein the predetermined area is predefined by the user.

24. The method according to claim 11, wherein the user criteria includes a predefined age range, education level, and gender.

25. The method according to claim 1, further comprising:
   determining whether the user is located within a predetermined distance from the predetermined area,
   determining whether the identified common topic is present on a predetermined list of topics,
   determining whether an author of at least one of the communications is present on a predetermined list of authors,
   determining whether a predetermined number of authors of the communications satisfy a user criteria, and
   determining whether a predetermined percentage of authors of the communications satisfy the user criteria.

* * * * *